(12) United States Patent
Jones

(10) Patent No.: US 7,720,740 B2
(45) Date of Patent: May 18, 2010

(54) SYSTEM OF FRACTIONAL OWNERSHIP OF INTELLECTUAL PROPERTY

(76) Inventor: Marion Darnell Jones, 4975 Spruce Bluff Dr., Atlanta, GA (US) 30350

(*) Notice: Subject to any disclaimer, the term of this patent is extended or adjusted under 35 U.S.C. 154(b) by 0 days.

(21) Appl. No.: 11/951,935

(22) Filed: Dec. 6, 2007

(65) Prior Publication Data

US 2008/0147541 A1    Jun. 19, 2008

Related U.S. Application Data

(60) Provisional application No. 60/868,821, filed on Dec. 6, 2006.

(51) Int. Cl.
*G06Q 40/00* (2006.01)
(52) U.S. Cl. ...................... 705/36 R; 705/35
(58) Field of Classification Search .............. 705/4, 705/7, 1, 35, 36 R, 38, 39
See application file for complete search history.

(56) References Cited

U.S. PATENT DOCUMENTS

| | | | |
|---|---|---|---|
| 7,130,825 B2* | 10/2006 | Vlahoplus et al. ............ 705/37 |
| 2001/0034695 A1 | 10/2001 | Wilkinson | |
| 2001/0047276 A1* | 11/2001 | Eisenhart ........................ 705/1 |
| 2002/0029183 A1* | 3/2002 | Vlahoplus et al. ............ 705/37 |
| 2002/0052818 A1* | 5/2002 | Loveland ..................... 705/36 |
| 2002/0087448 A1 | 7/2002 | Wilkinson | |
| 2002/0099637 A1* | 7/2002 | Wilkinson et al. ........ 705/36 R |
| 2002/0128849 A1* | 9/2002 | Wheelock ..................... 705/1 |
| 2004/0158515 A1* | 8/2004 | Schoen ........................ 705/35 |
| 2005/0108118 A1* | 5/2005 | Malackowski et al. ........ 705/30 |
| 2005/0262001 A1* | 11/2005 | Stewart .................... 705/36 R |
| 2006/0100948 A1* | 5/2006 | Millien et al. ................. 705/35 |
| 2006/0116942 A1* | 6/2006 | Woyke ........................ 705/35 |
| 2006/0253391 A1* | 11/2006 | Jacobs, Jr. .................... 705/40 |
| 2007/0106594 A1* | 5/2007 | Vlahoplus et al. ............. 705/37 |
| 2008/0046353 A1* | 2/2008 | Poltorak et al. ............... 705/37 |
| 2008/0140557 A1* | 6/2008 | Bowlby et al. ................ 705/37 |
| 2008/0147541 A1* | 6/2008 | Jones ......................... 705/39 |
| 2008/0288381 A1* | 11/2008 | Senecal ....................... 705/35 |
| 2009/0271333 A1* | 10/2009 | Payrovi ................... 705/36 R |

FOREIGN PATENT DOCUMENTS

| KR | 1020030021389 | 3/2003 |
|---|---|---|
| WO | WO 2006/115331 | 11/2006 |
| WO | WO 2006/115332 | 11/2006 |

OTHER PUBLICATIONS

Anonymous "ShAirForce, First Shared Aircraft Ownership Program, Signs Deal With Pace Airlines To Operate Fleet Of New Boeing Business Jets" Jun. 10, 2002 Business Wire, 2369.*

(Continued)

*Primary Examiner*—Kelly Campen
(74) *Attorney, Agent, or Firm*—Ryan A. Schneider, Esq.; Troutman Sanders LLP

(57) ABSTRACT

A system of fractional ownership of intellectual property, and a method for providing same. The system can comprise a pooling account, a first entity, and at least one second entity. The first entity can have an interest in an intellectual property, and can transfer at least a portion of such interest into the pooling account. The second entity can contribute consideration into the pooling account. In return for the consideration from the second entity, a commensurate fractional interest in the intellectual property can be associated with the second entity.

11 Claims, 7 Drawing Sheets

OTHER PUBLICATIONS

Riley et al. "New Restrictions (and New Opportunities) in Donating Trademarks, Copyrights and Other Intellectual Property." May 10, 2005 Mondaq Business Briefing , NA.*
Riley et al. "New Restrictions (and New Opportunities) in Donating Patents and Other Intellectual Property" May/Jun. 2005 Valuation Strategies v8n5 pp. 35-36.*
Anonymous "Liberty Diversified Holdings, Inc. Will Continue to Engage Avalon Advisors, Inc. and John Bates in Matters Relating to Expansion, Acquisitions & Mergers." Apr. 13, 2006 PR Newswire , NA.*
Korean International Search Report for PCT Application No. PCT/US2007/024978 dated Mar. 26, 2008.

* cited by examiner

SYSTEM OF FRACTIONAL OWNERSHIP OF INTELLECTUAL PROPERTY

CROSS REFERENCE TO RELATED APPLICATION

This application claims benefit, under 35 U.S.C. §119(e), of U.S. Provisional Application Ser. No. 60/868,821, filed 6 Dec. 2006, the entire contents and substance of which are hereby incorporated by reference.

BACKGROUND OF THE INVENTION

1. Technical Field of the Invention

The present invention relates generally to intellectual property, and more particularly to a business arrangement for one or more entities to share in the intellectual property assets of another, and the management of investments in such intellectual property assets.

2. Description of Related Art

In the past, intellectual property assets (including but not limited to the right of publicity, patents, trade secrets, know-how, copyrights, software, trademarks, domain names, and licenses) have had little understood value as an asset, sometimes leading to a determination of having no value as assets. Intellectual property assets have been classified as "intangibles" on corporate balance sheets. Related assets, such as products and technologies based in large part upon such intellectual property, have also frequently been assigned little or no concrete value.

In large measure, simply placing a value on intellectual property has been difficult, and has led to much of the public's and investors' confusion over the valuation of intellectual property, leading to the conventional diminution of value placed on intellectual property. Many attempts have been made at developing dependable and accurate valuation methods and processes for intellectual property and related assets, most unsuccessful.

It would be beneficial to provide not only an accurate valuation method for intellectual property, but also a business model to more successfully leverage the inherent value of the intellectual property to the owner. Further, it would be advantageous to provide a financial instrument to enable others to benefit, along with the intellectual property owner, in the value of the intellectual property.

Various financial instruments are known, and can be used in various ways in investment plans in intellectual property. For example, a derivative is a financial instrument whose value is based on the value of another security or underlying asset. A derivative can be used as an investment vehicle. That is, a derivative is essentially a financial instrument whose value is derived from the future movement of something that cannot be predicted with certainty. A derivative is a contractual relationship established by two or more parties where payment is derived from some agreed-upon benchmark.

Forward and futures contracts, the latter of which are standardized and may be exchange-traded, are transferable agreements to buy or sell a commodity, such as a particular crop, livestock, or oil. These contracts typically involve two parties agreeing upon the manner, place, and time of delivery of a certain size, quantity, or other property of a certain asset.

Options contracts are agreements, which may be exchange-traded, among two parties that represent the right to buy or sell a specified amount of an underlying security, asset, or financial instrument at a specified price within a specified time. The parties of options contracts are purchasers who acquire rights, and sellers who assume obligations. Further, a "call" option contract is one giving the owner the right to buy, whereas a "put" option contract is one giving the owner the right to sell the underlying security, asset or financial instrument. There is typically an up-front, non-refundable premium that the buyer pays the seller to obtain the option rights.

Swaps allow entities to exchange variable cash flows for fixed payments. They are similar to options but no premium is paid in advance to obtain the rights. A swap is essentially an outright trade based on the expected movement of the price of the derivative's underlying asset.

Another ownership vehicle for an asset is the fractional ownership model. Simply put, partial and fractional ownership is a way for one to get the most out of an investment by purchasing only the shares one requires, thus reducing the cost of purchase, but providing less than full ownership.

It is believed novel and non-obvious to apply the fractional ownership model to an intellectual property asset. It would be beneficial, once adopting tangible values for intellectual property and related assets, to securitize the intellectual property and create financial markets for the intellectual property using fractional ownership. It is to the provision of such a business model, a financial instruction for the securitization of intellectual property, and the creation of dependable and accurate financial markets for intellectual property assets that the present invention is primarily directed.

BRIEF SUMMARY OF THE INVENTION

Briefly described, in its preferred form, the present invention is a method system of fractional ownership of intellectual property. The present invention is preferably a business arrangement for one to share in the intellectual property assets of another. In a preferred form, the business arrangement is one of fractional ownership via a trust, and the investment instrument is a fractional share of the intellectual property. Also in a preferred form, the method of managing fractional ownership of intellectual property as disclosed herein can be performed on a computer. In other words, this method can be stored as computer-readable instructions on a computer-readable medium for execution by a processor.

Conventionally, the realm of fractional ownership of intellectual property rights pertinent to celebrities and their corresponding fan-bases has remained untapped as a demonstrated resource and bargaining tool for generating profitable income for celebrities. While preferred embodiments of the present invention relate to monetizing a celebrity's intellectual property via fractional ownership, it will be understood to those skilled in the art that the present invention can include the intellectual property of other entities, including not only celebrities, but other entities that need not be individuals, including corporations, tours, tracks, and other people or things that have a demonstrated fan-base willing to share in their successes. As used herein, "IP Entity" encompasses such persons, places, or things that can use the present invention to leverage their intellectual property.

In various embodiments, the present invention can range from, on one hand, a form of a fan club, (wherein fans of the IP Entity pay a fee to be associated with the IP Entity, and to enjoy various discounts, fan material, and other fan exclusive benefits), to on the other hand, an investment (wherein investors of the IP Entity pay a fee to invest in the IP Entity, and to enjoy various discounts, fan material, and other fan exclusive benefits, but wherein the investment is a financial instrument that may reward the investor with a time-valued payout). The present invention encompasses any form in between, including, for example, a collaborative plan incorporating elements of both the fan club, and the investment models.

The investors contribute any type of consideration, preferable money, in return for fractional ownership. The contributions of investors, or "Fractional Owners," to the IP Entity (or other holding entity for same) can be pooled into a pooling account. In a preferred embodiment, the pooling account is a trust. It will be understood by those of skill in the art that other pooling accounts can be used, depending on the various tax consequences and regulatory schemes of particular countries, at particular times. In a best mode of the present invention for a current U.S. investor, it appears that a trust provides a beneficial pooling account, wherein the percentages and variables that are crucial to the success of the present process cannot be manipulated as is the case in other investment environments.

The present invention of establishing fractional ownership of intellectual property by contribution to a trust is based on successful percentile split business models and transactional formulas utilized in the negotiation and effecting of lucrative business contracts for entertainment and sports celebrities. Generally, the quid pro quos of these agreements consist of money and fees exchanged for goods or services, rather than an exchange of intellectual property rights. In contrast, in the present invention, fans have the opportunity to become part-owners of intellectual property, and as a result, they are granted rights to use that intellectual property.

The present invention realizes exponential financial growth to the IP Entity in the form of increased revenues generated by cultivating the IP Entity's intellectual property rights by availing the use of the rights to its already existent fan-base, who not only contribute to the IP Entity, but also substantially benefit from a fractional ownership of the intellectual property.

Thus, the present invention generally relates to financial business contracts and transactions in the sports, entertainment and corporate contracts fields, specifically to the procurement of individual fractional ownership of intellectual property by contribution to a trust. These and other objects, features and advantages of the present invention will become more apparent upon reading the following specification in conjunction with the accompanying drawing figure.

DETAILED DESCRIPTION OF PREFERRED EMBODIMENTS

Figure 1:
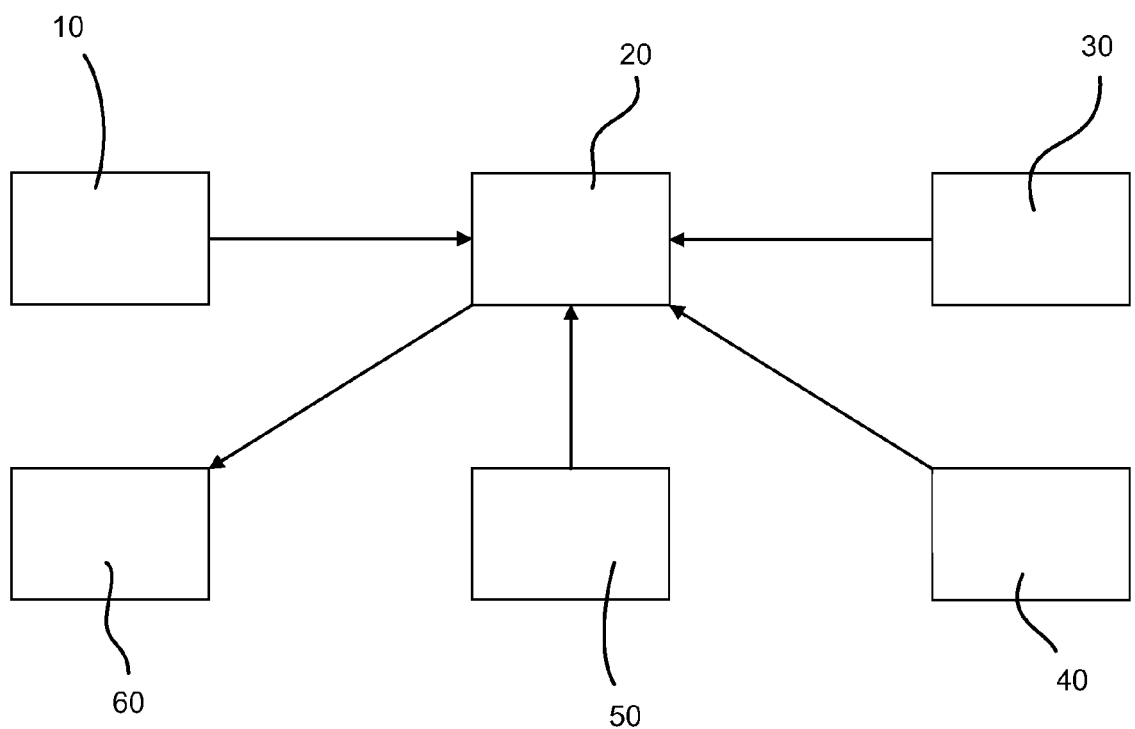
FIG. 1 is a flow diagram of an overview of a preferred embodiment of the present invention.

Referring now in detail to the figures, FIG. 1 illustrates a schematic of a preferred embodiment of the present invention, comprising the steps of creating a management team 10, establishing a pooling account 20, assignment of a pooling account leader 30, contribution by the IP Entity into the pooling account 40, contribution by the Fractional Owners to the pooling account 50, and providing to the Fractional Owners pooling account perks 60.

The step of creating a management team 10 preferably includes forming a pooling account team, or when the pooling account is a trust, forming a trust Management Team, comprised of four internationally established factions (Legal, Accounting, Finance and Insurance), whose function is to facilitate and govern all activities relative to the procurement of the individual fractional ownership of intellectual property.

In one embodiment, the step of establishing a pooling account 20 can include the step of forming a trust for the purpose of generating revenues and liquidating assets to be contributed to the trust by the IP Entity and its corresponding fan-bases.

In simple terms, a trust is a relationship in which an entity transfers something of value, called an "asset," to another entity, called a "trustee." The trustee then manages and controls this asset for the benefit of an entity, which can be a third party, called a "beneficiary". Individuals, banks, trust companies or corporations may all serve as trustees. Trusts can be used for personal and corporate reasons relating to many things, including control, and to reduce income, gift, or federal estate taxes. A cestui que trust is the entity named in a trust to derive future benefit from the trust and receive his share of payments and distributions if any made by that trust.

The step of assignment of a pooling account leader 30 can include assignment of a trustee in one embodiment. The trustee acts as the sole custodian of the property and services housed in the trust, with principal responsibility of overseeing the influx of contributions made to the fund as well as the outflow of resultant profits and revenues.

The step of contribution by the IP Entity into the pooling account 40 can include the contribution of assets in the form of intellectual property rights or cash donations to the trust by the IP Entity. The majority of intellectual property from an IP Entity that is a film or sports star will be their personality rights and various licenses, versus patents, trade secrets, know-how, software, trademarks, and domain names. After the initial contribution by the IP Entity of intellectual property rights to the trust, subsequent contribution from the IP Entity can include a percentage of its revenues from sources other than the fractional ownership of the intellectual property at issue.

Personality rights are an area of intellectual property that has gained attention in the United States for protection of pop culture idols such as Elvis Presley. Performing artists and sports figures traditionally have not had much copyright protection—and none at all if the performance was not electronically recorded or otherwise fixed.

At a national and international level, performers and publishers have sought to strengthen neighboring rights (the droits voisins) under copyright law. Performers and other celebrities have concurrently sought to control commercial exploitation of their persona through existing trade practices law (for example, restrictions on false claims that a performer has endorsed a particular product) or special rights of publicity legislation.

The step of contribution by a Fractional Owner to the pooling account 50 can include a range of contributions, including a fixed dollar contribution to the trust in exchange for a percentage ownership, which can lead to a percentage of the IP Entity's outside revenues and the right to use the intellectual property assigned to the trust by the IP Entity.

These perks are incentives for contributing to the fund and participating in the plan, thereby creating a fractional ownership of the intellectual property for the fan-base contributor. The trust can guaranty a certain percentage of the revenues generated by the trust to both the IP Entity and Fractional Owners.

The step of providing to a Fractional Owner pooling account benefits 60, can include in a preferred embodiment, that after a seven-year period, the trust either relinquishes the assets to, or renews its relationship with, the IP Entity and other beneficiaries of the trust. In alternative embodiments, step 60 includes other benefits, beyond financial, for example, various discounts, fan material, and other fan exclusive benefits.

Figure 2:
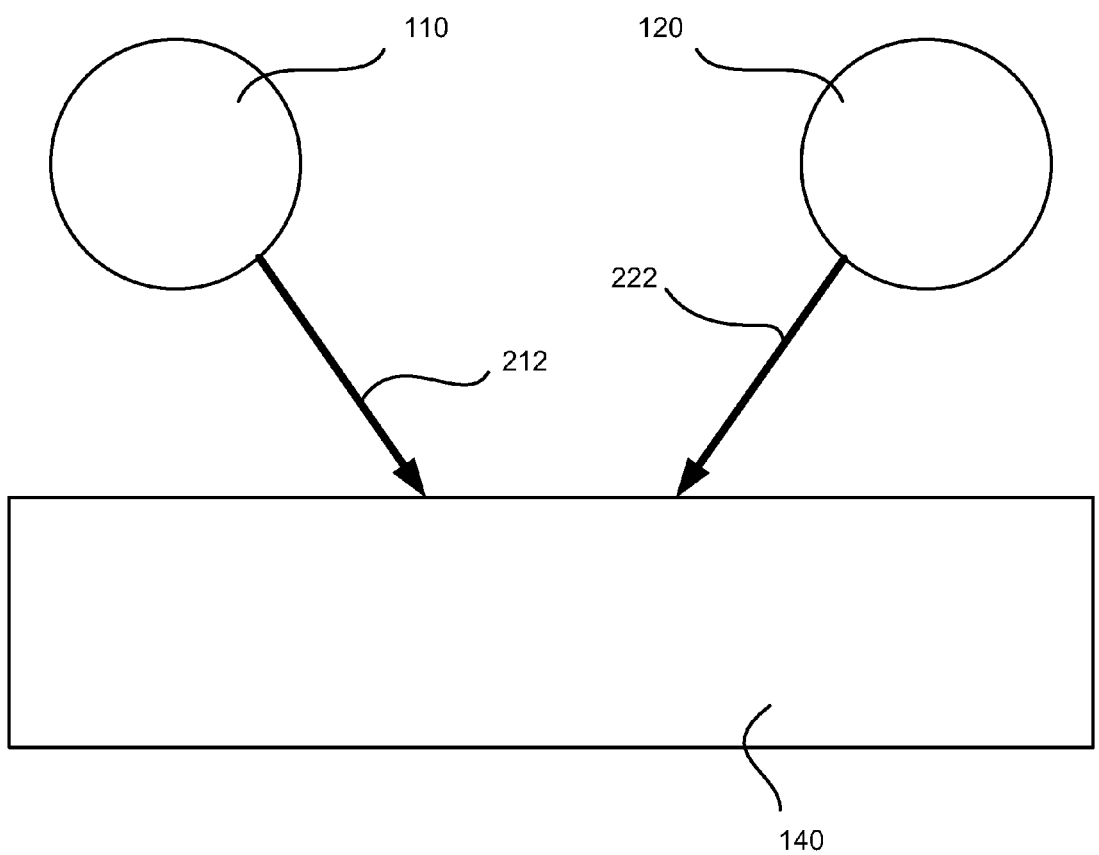
FIG. 2 represents the opening step of a preferred embodiment of the present invention.

FIG. 2 illustrates the opening steps of fractional ownership in a preferred embodiment. The IP Entity 110 transfers 212 its intellectual property 112 into the pooling account 140, which can be a trust. The Fractional Owners 120 contribute 222 funds, which represent the purchase price of their shares of the intellectual property, into the pooling account as well. These elements are placed into the pooling account for the benefit of the IP Entity 110, the Fractional Owners 120, and the Management Team (not shown).

Figure 3:
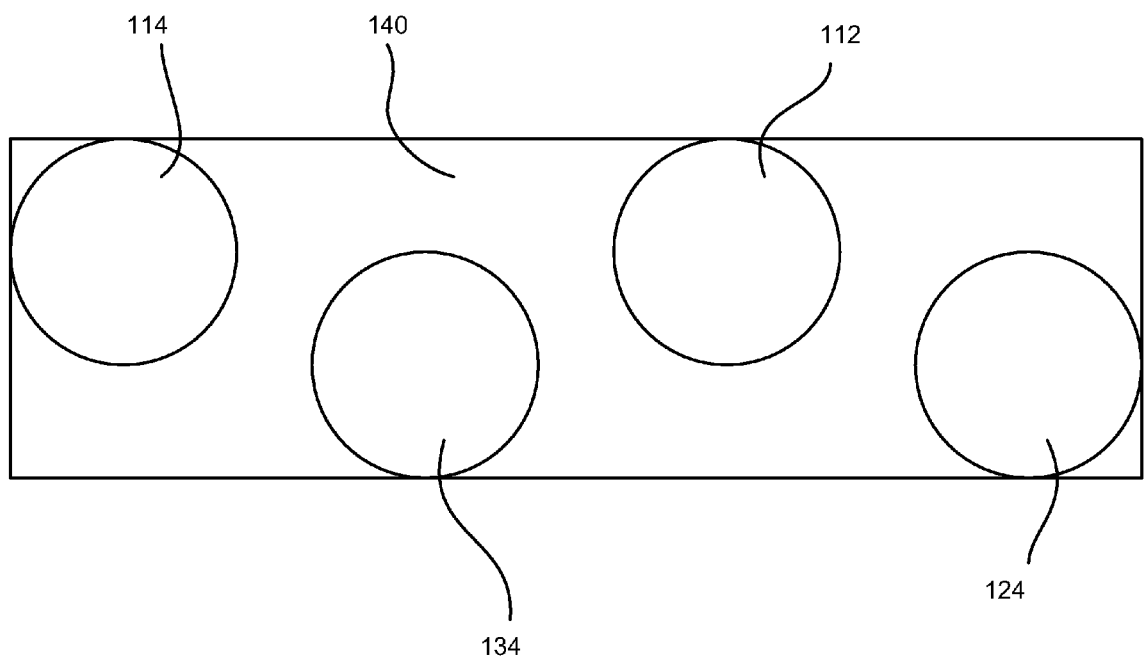
FIG. 3 is a breakdown of the elements of which the pooling account is comprised in a preferred embodiment.

FIG. 3 shows a breakdown of the pooling account 140 in a preferred embodiment. The pooling account can be made up of four elements: funds allocated the IP Entity 114, funds allocated to the Management Team 134, funds allocated to the Fractional Owners 124, and the actual intellectual property 112.

In a preferred embodiment, when the Fractional Owners 120 contribute to the pooling account 140, as shown in FIG. 2, their total contribution goes into the pooling account and is allocated among the IP Entity 110, the Management Team 130, and the Fractional Owners 120. The formula for allocating the funds can be predetermined by contract. In a preferred embodiment, the IP Entity 110 is allocated 60% of the funds, while the Management Team 130 and the Fractional Owners 120 are allocated 20% of the funds each.

The availability of the funds in the pooling account to each party can also be governed by contract. In a preferred embodiment, the funds for the IP Entity 110 are freely available to the IP Entity 110, who may withdraw them at any time, or have them distributed to him as soon as they are placed in the account.

In contrast, in a preferred embodiment, the funds allocated to the Fractional Owners 120 are generally not available for withdrawal or distribution. These funds constitute credit lines for individual Fractional Owners 120. The amount of each credit line can depend on the terms of each Fractional Owner's contract for fractional ownership. In a preferred embodiment, each credit line amount is the portion of the total funds allocated to the Fractional Owners 120 that is proportional to the contribution made by each Fractional Owner 120. For example, if Fractional Owners A, B, and C contribute $25,000, $25,000, and $50,000 respectively, then Fractional Owner C will have a credit line of 50% of the total funds allocated to the Fractional Owners 120, because his contribution was 50% of the total contribution. If 20% of the total contributions is allocated to the Fractional Owners, then Fractional Owner C would have a credit line of 50% of 20% of the total contributions, or $10,000 worth of credit.

Funds allocated to the Management Team 130 can also be made available in any manner of ways. In a preferred embodiment, these funds can be made immediately available for withdrawal by, or distribution to, the Management Team 130. This manner of availability is similar to a system of commission, in which the Management Team 130 gets paid when the pooling account gets paid and in an amount set by a predetermined percentage of the total funds contributed to the pooling account. Alternatively, in another embodiment, funds can be made available to the Management Team 130 on a set schedule, similar to the payment of salary or wages.

Figure 4A:
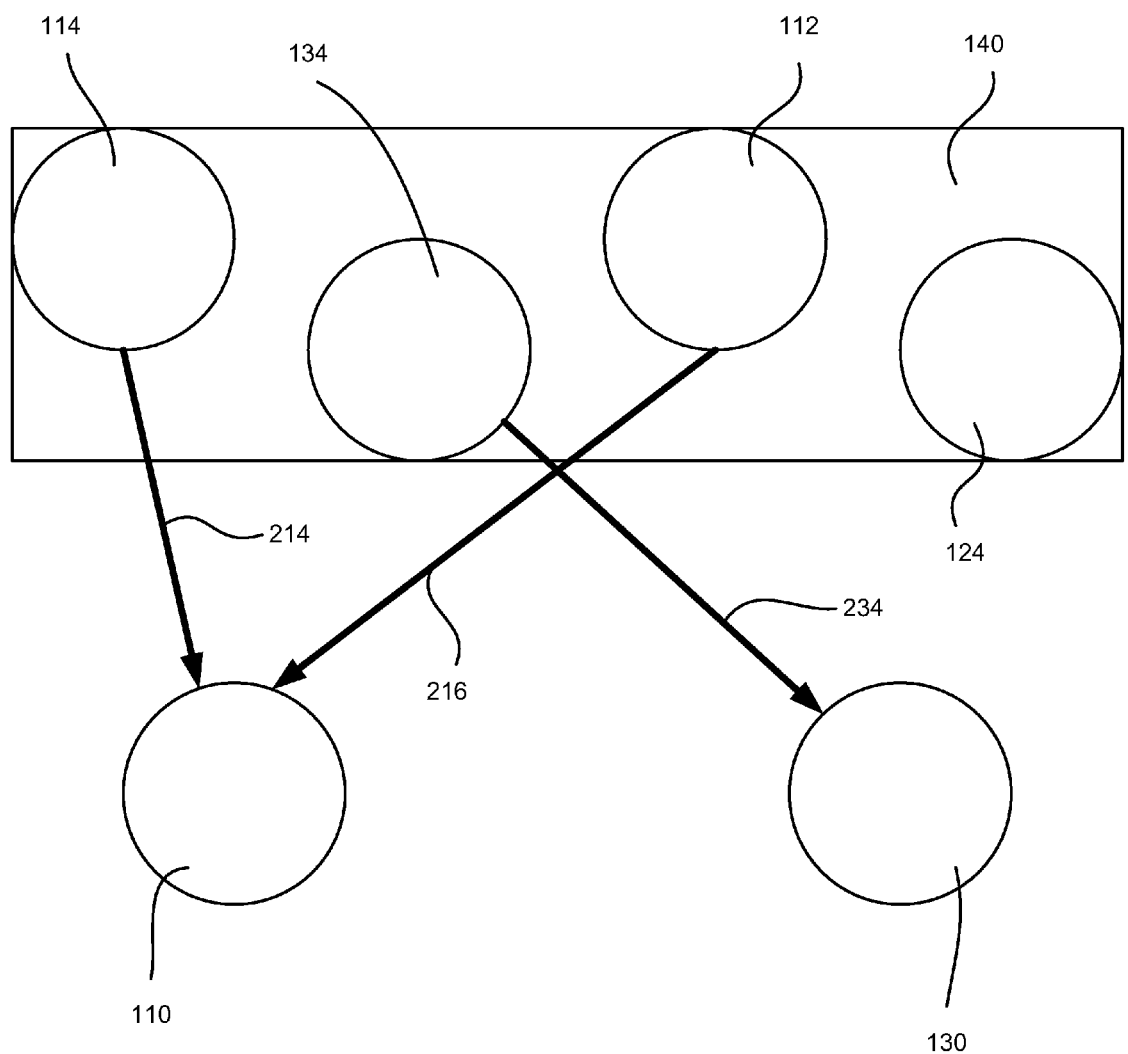
FIG. 4A shows the normal flow of funds out of the pooling account according to a preferred embodiment of the present invention.

FIG. 4A shows the normal flow of funds out of the pooling account according to a preferred embodiment. In a preferred embodiment, the IP Entity 110 can withdraw 214 funds allocated to the IP Entity 110 at will, and can also make full use 216 of the intellectual property 112, which the IP Entity 110 contributed to the account. Also in a preferred embodiment, the Management Team 130 receives 234 funds allocated to it in return for its management of the pooling account 140 and of the system of fractional ownership.

Figure 4B:
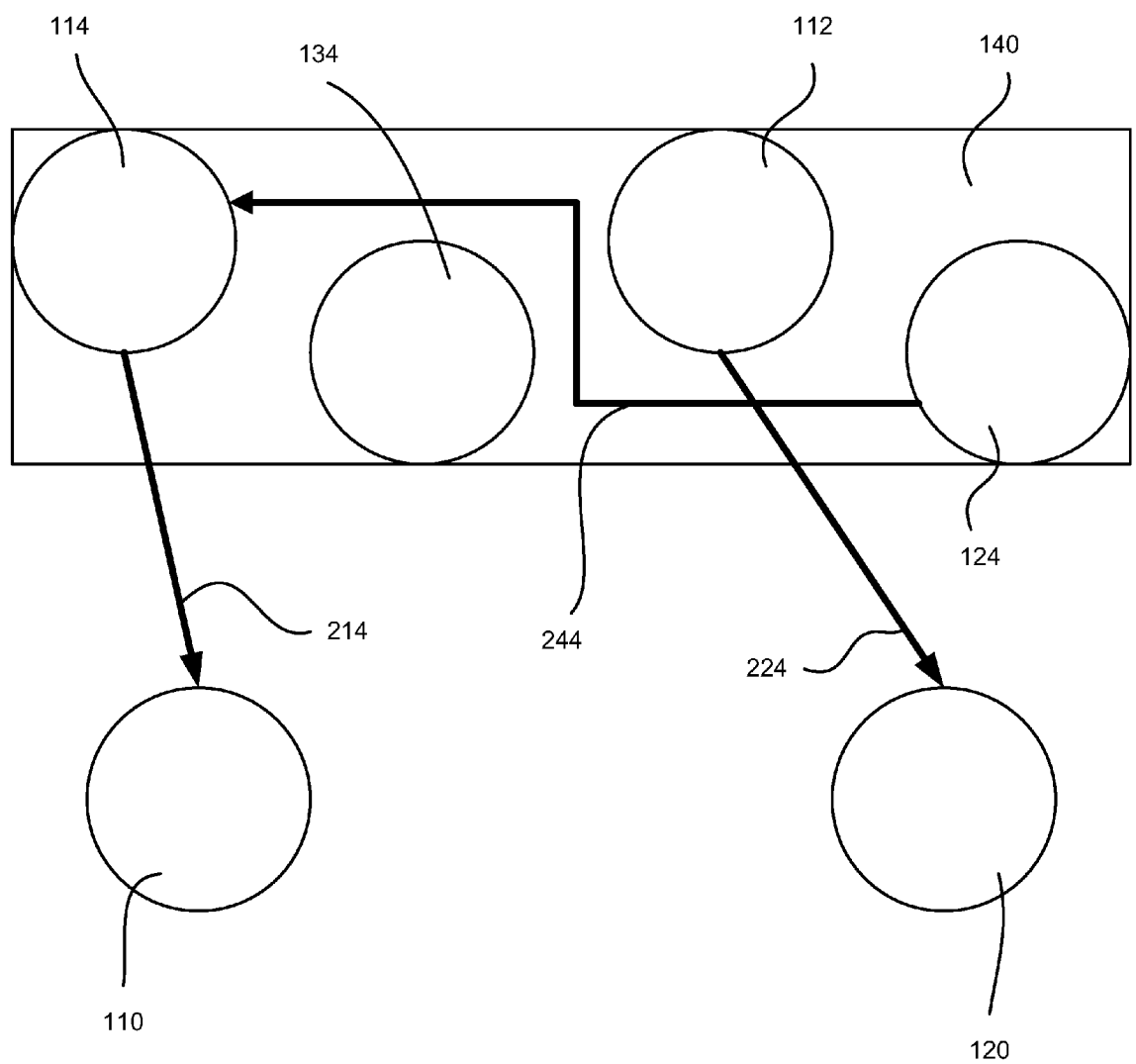
FIG. 4B shows the flow of funds and advantages when a Fractional Owner makes a purchase from his credit line in a preferred embodiment of the present invention.

FIG. 4B shows the flow of funds and perks when a Fractional Owner 120 makes a purchase from his credit line in a preferred embodiment. By virtue of having contributed to the pooling account 140, each Fractional Owner 120 can be granted limited rights with respect to the intellectual property 112 and, possibly, with respect to the IP Entity 110. In a preferred embodiment, the credit lines are a means for the Fractional Owners 120 to exercise their rights in the intellectual property 112 and in the IP Entity 110. Fractional Owners 120 can use their credit lines to purchase discounted fan materials, uses of the intellectual property 112, uses of real property owned by the IP Entity 110, corporate advantages, or other perks, as can be outlined in the contracts of the Fractional Owners 120.

As shown in FIG. 4B, when a Fractional Owner 120 uses his credit line to purchase a perk of fractional ownership, the corresponding funds 124 in the pooling account can be reallocated 244 to the IP Entity 110. As mentioned previously, in a preferred embodiment, the IP Entity 110 is free to withdraw 214 any funds allocated to it, so after a credit line purchase, the IP Entity 110 can withdraw 214 the funds used to purchase the perks of fractional ownership. In return for his purchase, the Fractional Owner 120 is granted 224 whatever perks he purchased. In a preferred embodiment, these credit line purchases can be made via a computer system that tracks the credit lines and the perks available to each Fractional Owner 120.

Figure 4C:
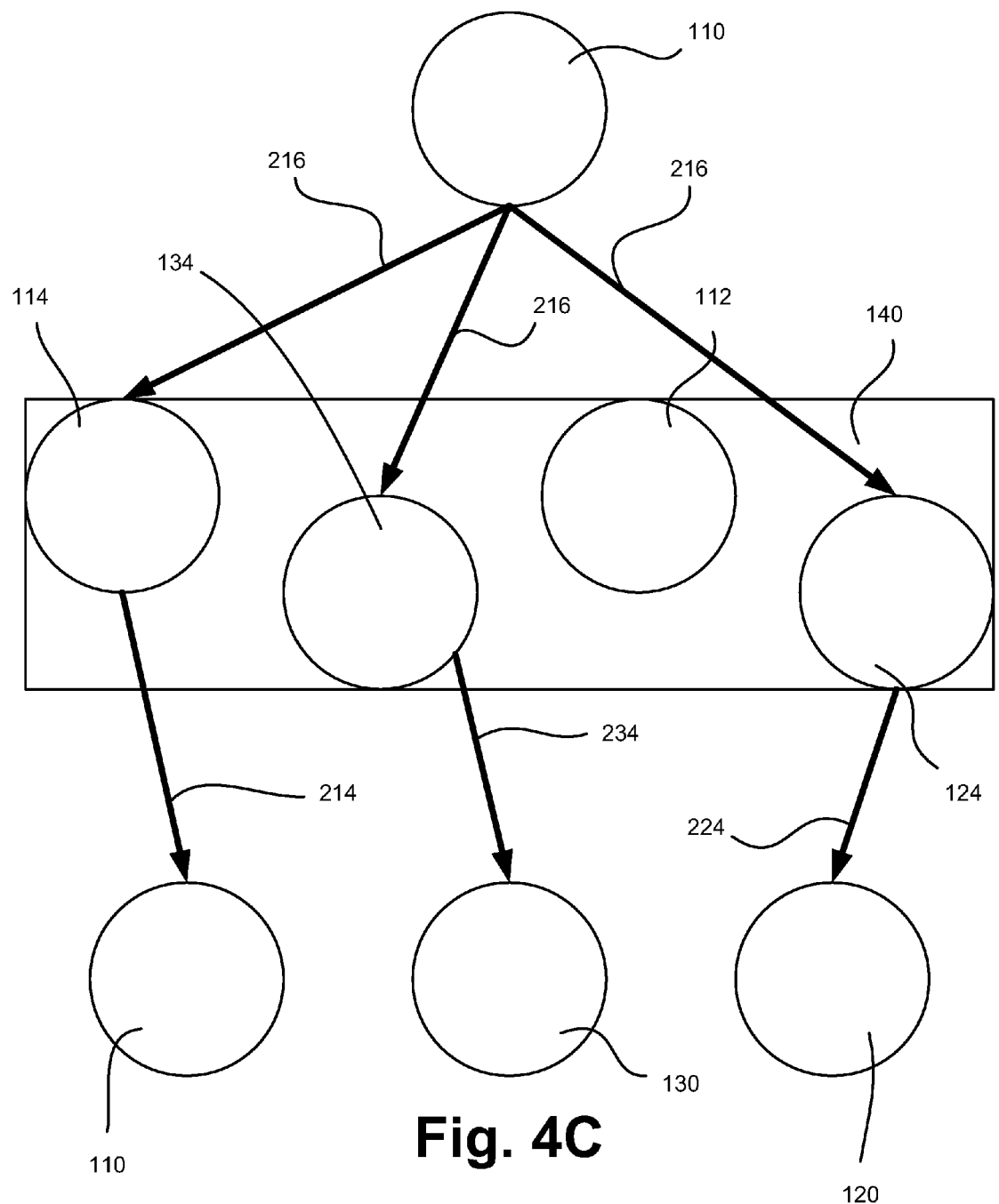
FIG. 4C shows the flow of funds when the IP Entity contributes outside revenues to the pooling account in a preferred embodiment of the present invention.

FIG. 4C shows the flow of funds when the IP Entity 110 contributes 216 outside revenues to the pooling account 140 in a preferred embodiment. In a preferred embodiment, when the IP Entity 110 works or otherwise generates revenue outside of the fractional ownership system, the IP Entity 110 may be required to contribute 216 a portion of such revenues into the pooling account 140 for the benefit of itself, the Fractional Owners 120, and the Management Team 130. The contributed revenues can be divided according percentages predetermined by contract. In a preferred embodiment, the percentages are the same as those used to allocate the initial contributions of the Fractional Owners 120.

When the IP Entity 110 contributes outside revenues, the revenues allocated to each party can be treated in any number of manners. In a preferred embodiment, the share allocated to the IP Entity 110 is made immediately available for withdrawal or distribution 214 to the IP Entity 110. A preferred embodiment can even deduct the share that would be allocated to the IP Entity 110 from the amount of outside revenues contributed to the pooling account 140, so that this amount remains in the power of the IP Entity 110 and is never contributed to the pooling account 140. In a preferred embodiment, the Management Team's share can be made immediately available, or it can be paid out 234 to the Management Team 130 according to a schedule.

In a preferred embodiment, the share of outside revenues allocated to the Fractional Owners 120 can increase the credit lines of the Fractional Owners 120, allowing them greater power to purchase perks, including rights to use the intellectual property. Alternatively, these funds could be made immediately available for withdrawal 224 by, or distribution to, the Fractional Owners 120, similar to cash dividends. In another embodiment, these funds could increase the value of the fractions owned, thereby increasing the ultimate purchase price required for the IP Entity 110 to repurchase the entirely of its original rights in the intellectual property.

Figure 5:
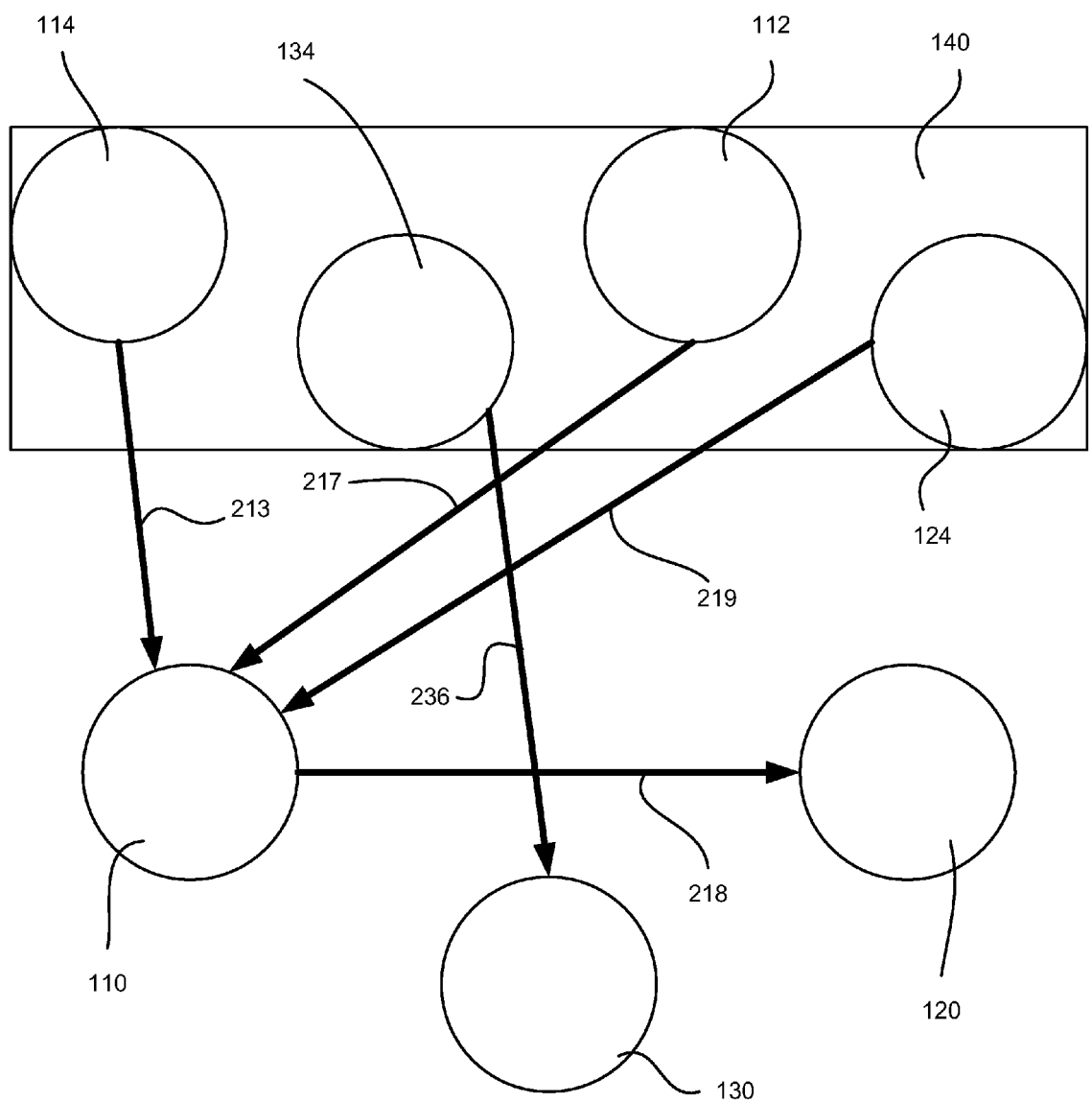
FIG. 5 shows the steps of terminating the fractional ownership relationship in a preferred embodiment of the present invention.

FIG. 5 shows the steps of terminating the fractional ownership relationship in a preferred embodiment. All funds allocated to the IP Entity 110 and to the Management Team 130 can be distributed 213 to the IP Entity 110 and distributed 236 the Management Team 130 respectively. The intellectual property can be returned 217 to the IP Entity 110, its original full owner. In one embodiment, the IP Entity 110 can be required to repurchase 218 the intellectual property from the Fractional Owners 120. In that case, any outside revenues contributed by the IP Entity 110 and allocated to the Fractional Owners 120 could have been applied to increase the value of the fractional ownership of the intellectual property. As such, in a preferred embodiment, for the repurchase 218, the IP Entity 110 can be required to pay the Fractional Owners 120 the percentage of their original contribution that was allocated back to them in addition to any increase in value from undistributed outside revenues allocated to the Fractional Owners 120. A preferred embodiment can cap the repurchase price at the total combined price originally paid by the Fractional Owners 120. In a preferred embodiment, after the IP Entity 110 reacquires full rights to intellectual property, whether by purchase or by some other form of transfer, the remaining funds allocated to the Fractional Owners 120, representing rights to use the intellectual property, are also distributed 219 to the IP Entity 110.

In a preferred embodiment, the Management Team 130 comprises, among others, at least one attorney. The attorney can be responsible for protecting the legal interests of the IP Entity 110 and the Fractional Owners 120, and may choose to institute insurance or bonding for the system of fractional ownership.

The following formulae provide a preferred process of the present invention:

$$M_\mu^4 = [\alpha f \text{æ} í]^{inb} \quad \text{Formula 1}$$

Formula 1 illustrates the Management Team, its component parts, and the pertinent characteristics of the components, wherein $M_\mu^4$ is an integer symbol for Management Team. The team is composed of four basic factions, as denoted by the superscript 4. $[\alpha f \text{æ} í]^{inb}$ is the expression for the four factions of Management Team: $\alpha$, attorneys; f, financial institution; æ, accountants; and í, insurers. inb denotes "internationally and nationally based".

$$IP^R + X\% IP^E_{GP} \longrightarrow cq\text{Ђ}^a \longleftarrow X\$ \quad \text{Formula 2}$$
$$\uparrow \qquad (\S \text{Ŧ}^2 \text{Ŧ}^3 \infty) \qquad \uparrow$$

Formula 2 illustrates the pooling account in the form of a trust, with its pertinent characteristics, the flow of assets from the IP Entity and fan-base contributors to the trust. The formula and identifies the assets that are contributed to the trust by the IP Entity and fan-base contributors.

$IP^R + X\% IP^E_{GP}$ is the formula for assets contributed to trust by IP Entity. $IP^R$ represents intellectual property rights. X % is the percentage contributed by the IP Entity. $IP^E_{GP}$ represents the gross profits (or outside revenues) of the IP Entity. $cq\text{Ђ}^a$ is an integer symbol for trust assets. $cq\text{Ђ}$ is the trust. a is assets. $(\S \text{Ŧ}^2 \text{Ŧ}^3 \infty)$ is an integer expression for components of trust. § is section. $\text{Ŧ}^2$ is section number reference (trust, section 2, 3, etc.). ∞ represents an infinite number of trust sections. X$ is the symbol for revenues contributed to the trust by the Fractional Owners. Finally, $IP^E$ represents the IP Entity.

$$IP^E \downarrow \qquad FB^C \uparrow \quad \text{Formula 3}$$

Formula 3 illustrates the symbols and identifiers of the IP Entity and the fan-base contributors, wherein $FB^C$ is the symbol for fan-based contributor, or Fractional Owner.

$$X\% \Gamma\text{Ɽ} \longleftarrow cq\text{Ђ}^l \longrightarrow X\% \Gamma\text{Ɽ} + \Pi \quad \text{Formula 4}$$

Formula 4 illustrates the computation of the liabilities to the trust, namely the percentage of gross revenues guaranteed to the IP Entity, and the percentage of the gross revenues, plus the perks guaranteed to the fan-base contributors. $X\% \Gamma\text{Ɽ}$ is the formula for the calculation of trust liability to IP Entity. The symbols represent as follows: X %, percentage integer; $\Gamma\text{Ɽ}$ gross revenues; $cq\text{Ђ}^l$ is the integer symbol for trust liabilities; $cq\text{Ђ}$ the cestui que trust; l, liability; and $X\% \Gamma\text{Ɽ} + \Pi$, the formula for calculation of trust liability to fan-based contributor, wherein X % is a percentage integer, $\Gamma\text{Ђ}$ represents gross revenues, and $\Pi$ represents perks.

$$M_\mu^4 = [\alpha f \text{æ} í]^{inb} \quad \text{Formula 5}$$
$$\updownarrow$$
$$IP^R + X\% IP^E_{GP} \longrightarrow cq\text{Ђ}^a \longleftarrow X\$$$
$$\uparrow \qquad (\S \text{Ŧ}^2 \text{Ŧ}^3 \infty) \qquad \uparrow$$
$$IP^E \downarrow \qquad FB^C \uparrow$$
$$\uparrow \qquad \qquad \uparrow$$
$$X\% \Gamma\text{Ɽ} \longleftarrow cq\text{Ђ}^l \longrightarrow X\% \Gamma\text{Ɽ} + \Pi$$

Formula 5 depicts the sub-formulae comprising the concept as a whole, showing both intra- and inter-level correlations between, and the characteristics of, the trust, the IP Entity and the Fractional Owners, with emphasis on the influx and outflux of assets and liabilities to and from said trust.

The above formulae convey each stage of a preferred process of the present invention. These formulae detail the requisite components of each level, depict both the intra- and inter-level interaction between the elements, and outline the sequential flow and outputs resulting therefrom.

In a preferred embodiment, the establishment of the pooling account corporation will be mainly in accordance with local and federal legislation. A preferred embodiment comprises a Management Team including at least four basic factions or sub-corporations: legal, financial, accounting, and insurance, with national and international standing. The pooling account is created. If the pooling account is a trust, then a trustee identified to manage the assets of the trust.

Research can be conducted to develop and identify advantageous IP Entities and corresponding fan-bases that can benefit from the present invention. A detailed marketing plan can be developed, and comprehensive marketing campaign can be implemented to introduce all facets of the concept to potential fan contributors and potential IP Entities.

Further steps can include obtaining letters of intent, licensing agreements, assignments of rights, and other contracts for intellectual property rights from the IP Entity. Steps can also include effecting financial documents pertinent to the fan-base and obtaining contributions from the fan-base, establishing of promotional activities to generate future revenues, and developing a remuneration system.

Obvious traps to avoid would include the capricious selection of an IP Entity. Potential IP Entities can have a fan-base commensurate with maximizing the monetization of the intellectual property, utilizing inexact integer percentages, and not limiting the life of the financial relationships for a time certain, for example, the preferred seven-year period.

In a preferred embodiment, in order to generate proceeds from its intellectual property, the IP Entity assigns its legal rights to its intellectual property to a trustee, thereby placing the intellectual property in a trust.

Investors, later to become Fractional Owners, contribute funds into the trust for the benefit of the IP Entity, the Management Team, and themselves. According to a predetermined schedule, a portion of the contributions of Fractional Owners is allotted to each of the IP Entity, the Fractional Owners, and the Management Team.

In a preferred embodiment, each Fractional Owner is granted a credit line for the procurement of products and favorability in the amount of its own share of Fractional Owner contributions allotted back to the Fractional Owners. Each Fractional Owner can purchase certain advantages, which are available to the Fractional Owners by virtue of their fractional ownership. As predetermined by executed contracts, Fractional Owners can purchase fan materials, the right to participate in fan activities, and can even be eligible for corporate advantages and the use of real property related to the IP Entity. The availability of certain advantages can be prearranged by contract. The present invention allows Fractional Owners, which can be individual persons or small entities, the benefits of ownership of an intellectual property, without the burden of having to arrange and finance a licensing agreement.

The IP Entity can contribute a percentage of its revenues from other activities, or of its revenues from other activities just related to the intellectual property. In accordance with predetermined percentages, these revenues are divided among the IP Entity, the Fractional Owners, and the Management Team. In a preferred embodiment, the Management Team's share is placed into the trust for its benefit, and paid out as wage or salary to the individual members of the team. The IP Entity's share can be placed in the trust and paid back out to the IP Entity immediately, or in accordance with preset guidelines. In an alternate embodiment, the IP Entity contributes a percentage of its outside revenues after already having deducted its share of that percentage of those revenues. The Fractional Owners' share is placed in the trust for their benefit. Each Fractional Owner is entitled to a portion of this share, which can correspond to each Fractional Owner's initial contribution into the trust. Each Fractional Owner's individual portion can be paid out to that Fractional Owner immediately or according to a schedule, or the portion can be applied to increase the Fractional owner's credit line, or the portion can be applied to increase the value of the Fractional Owner's effective ownership of the intellectual property, or a combination of these options can be used.

For example, in one embodiment, when the IP Entity contributes its outside revenues into the trust, that contribution increases the value of the ownership of the Fractional Owners. At the termination of the fractional ownership relationship, the IP Entity can have the right to purchase back the entirety of its intellectual property from the Fractional Owners. Any increase in value of the ownership of Fractional Owners can be considered, by means of a predetermined formula, to increase the price to the IP Entity of purchasing back its intellectual property. In another embodiment, the Management Team may choose distribute portions of the Fractional owners' share to the Fractional Owners, similar to the manner in which cash dividends might be distributed to shareholders of a corporation. Then in a preferred embodiment, only undistributed funds would be considered in determining the ultimate repurchase price of the intellectual property. In one embodiment, the purchase price may be bound so as not to exceed the combined initial purchase price of the Fractional Owners.

All funds contributed by the Fractional Owners support the IP Entity either directly or indirectly. The IP Entity's share of the contributions supports the IP Entity directly, because these funds can be distributed immediately to the IP Entity or held in trust for the benefit of the IP Entity. The Management Team's share goes to the Management Team, which manages the fractional ownership of the intellectual property, thereby allowing the IP Entity to acquire funds generated for the IP Entity's benefit. The Fractional Owners' share is made available for the Fractional Owners to purchase products, services, and favorability from the IP Entity, further benefiting the IP Entity by generating proceeds from these purchases. Even if a Fractional Owner makes no purchases during the term of the fractional ownership, the funds remain in trust or are otherwise available for investing, which can generate proceeds for the IP Entity. Further, because this system of fractional ownership can be governed by contractual agreement, it can be made to terminate, thereby returning full ownership of the intellectual property to the IP Entity.

In a preferred embodiment, all parties benefit when the IP Entity is successful. As a result, Fractional Owners and the Management Team are encouraged to promote the IP Entity, and Fractional Owners are further encouraged to make wise use of the intellectual property so as not to damage the reputation of the IP Entity. The revenues generated for the IP Entity through use of the system of the present invention can potentially be beyond the IP Entity's ability to otherwise generate revenues from the use and licensing of its intellectual property.

The system of the present invention can be terminated in any number of manners. In one preferred embodiment, when the term of fractional ownership ends, all portions of the credit lines of Fractional Owners that remain unused revert back to the IP Entity along with the intellectual property. The Fractional Owners, who had the opportunity to take advantage of their credit lines, are entitled to nothing in this embodiment. In another embodiment, any remaining credit of the Fractional owners is considered in the determination of the purchase price at which the IP Entity repurchases its intellectual property. As mentioned above, any accumulated proceeds contributed by the IP Entity could also be considered when determining this price.

In preferred embodiments, there can be a single trust, in which all property and funds are placed, or alternatively, there can be three separate trusts for each of the IP Entity, the Fractional Owners, and the Management Team. If three separate trusts are used, then when funds are contributed, whether by the Fractional Owners or by the IP Entity, these funds are first divided into portions corresponding to the present percentages by which the beneficiaries benefit. After the funds are divided, they are placed the appropriate trusts, to benefit one of the Management Team, the IP Entity, or the Fractional Owners.

The following are examples of preferred embodiments of the present system. It will be understood by those skilled in the art that the fan contribution, pooling account, time periods, etc. are illustrative only.

Example 1

Celebrity/Entertainment Intellectual Property Entity

Oprah Winfrey is the doyenne of daytime television. Her global empire spans books, magazines and movies, all originating from her eponymous talk show. Syndication is also contributes largely to her gross revenues, as well as a large percentage of the revenue from Harpo's Dr. Phil.

Oprah has some 49 million viewers per week, generates approximately $225M in revenues each year, and pays some 30-40% of that income in taxes. Her fan-base contributes 60 to 70% of their support to her.

Should 1 million of the 49 million viewers, or fan-base, purchase/contribute/invest $10,000 towards the end of acquiring fractional ownership of Oprah's enterprises, revenues of $10 billion are generated. Depending on the preferential tax system utilized, this could provide a tax deduction to the fan-base. Further, the fan-base would be afforded the privilege of utilizing properties, both real and intellectual, associated with Oprah's enterprises.

Oprah, as the celebrity IP Entity, would return 30-40% of the generated revenues to the fan-base, which would provide a tax shelter for her, plus allow the use of intellectual property rights associated with her enterprises as incentives for the fans to participate in the fractional ownership.

The funds generated could be divided in many ways, for example as follows: 60% to Oprah; 20% to the Fractional Owners; and 20% to the Management Team.

Considering the foregoing, Oprah would realize $6 billion, in comparison to $225 million taxed at 35-45%. The Fractional Owners would receive $2 billion, in comparison to $0 that they currently receive for supporting Oprah, and the Management Team the remaining $2 billion.

The relationship between the preferred tax system and the IP Entity or Fractional Owners can continue for a predetermined term, for example, a period of seven years, at which time the relationships can be renewed or dissolved.

Example 2

Corporate Intellectual Property Entity

Delta Air Lines, Inc. is a major U.S. airline headquartered in Atlanta, Ga. and operates a large domestic and international network that spans North America, South America, Europe, Asia, the Middle East, the Caribbean, and is the only U.S. airline to serve Africa. Delta currently has the largest route network "footprint" of any airline. It is the second-largest airline in the world, and, in terms of total operating revenues, is the fourth-largest airline in the world.

Delta grosses approximately $1 billion yearly, and carries some 119 million passengers per year. Of the generated income, Delta pays some 30-45% in income taxes. This income is sale generated and consists of 100% support by Delta patrons.

Should 1 million of Delta's 119 million passengers purchase/contribute/invest $10,000 towards the end of acquiring fractional ownership of Delta's enterprises, instant revenue of $10 billion is realized. Depending on the preferential tax system, this could be tax deductible to the fan-base. Further, the Fractional Owners would be afforded the privilege of utilizing properties and likenesses associated with Delta's enterprises, as perks for participating in the ownership.

Delta, as the IP Entity, would return 30-45% of the generated revenues, which would provide a tax shelter for Delta, plus allow the use of intellectual property rights associated with Delta's enterprises as incentives for investors to participate in the fractional ownership.

The funds generated could be divided as follows: 60% to Delta; 20% to the Fractional Owners; and 20% to the Management Team.

Considering the foregoing, Delta would realize $6 billion, in comparison to $1 billion taxed at 30-45%. The Fractional Owners would receive $2 billion and perks, in comparison to $0 that they currently receive for supporting Delta, and the Management Team the remaining $2 billion.

The relationship between the preferred tax system and the IP Entity or Fractional Owners continues for, for example, a period of seven years, at which time the relationships can be renewed or dissolved.

Example 3

Sports Intellectual Property Entity

LeBron James is an NBA basketball player drafted by the Cleveland Cavaliers directly from high school in Akron, Ohio, and has a fan-base in Cleveland alone of some 50 million persons. He grosses approximately $45 million annually, which includes products and endorsements from Nike Corporation, and which income is taxed at a rate of 30-40%. The Cleveland franchise in and of itself is valued at approximately $300 million.

Should 100,000 of LeBron's 50 million Cleveland fan-base purchase/contribute/invest $10,000 towards the end of acquiring fractional ownership of the LeBron/Nike enterprise, the resultant revenues would be $1 billion. Depending on the preferential tax system, this could be tax deductible to the Fractional Owners. Further, the Fractional Owners would be afforded the privilege of utilizing properties and likenesses associated with LeBron and Nike, as perks for participating in the ownership.

LeBron, as the IP Entity, would return 30-40% of the generated revenues to the Fractional Owners, which would provide a tax shelter for LeBron, plus allow the use of intellectual property rights associated with his enterprises as incentives for the fans to participate in the fractional ownership.

The funds generated could be divided as follows: 60% to LeBron; 20% to the Fractional Owners; and 20% to the Management Team.

Considering the foregoing, and bearing in mind that, as mentioned hereinabove, the Cleveland franchise is worth approximately $300 million, LeBron would realize $600 million himself, in comparison to $45 million taxed at 30-40%. The Fractional Owners would receive $200 million and perks, in comparison to $0 that they currently receive for supporting LeBron and the Management Team the remaining $200 million. Further, because LeBron's exponential net worth will further benefit him as it would provide for increased leverage for future negotiations with Nike and other corporations with respect to products and endorsements.

The relationship between the preferred tax system and the IP Entity or Fractional Owners continues for a period of seven years, at which time the relationships can be renewed or dissolved.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A computer-implemented method for managing fractional interests in intellectual property, the method comprising:
   pooling a first consideration from a first entity into a pooling account, the first consideration comprising an intellectual property interest;
   pooling a plurality of additional considerations from a plurality of additional entities into the pooling account, the plurality of additional considerations comprising considerations other than interests in intellectual property;
   apportioning, by a computer processor, fractional interests in the first consideration to the plurality of entities, wherein a value of the first consideration apportioned to a particular entity of the plurality of entities corresponds to a value of consideration contributed to the pooling account by the particular entity;
   allocating the plurality of additional considerations in predetermined percentages to benefit at least the first entity and the plurality of additional entities;
   allotting credit lines to the plurality of additional entities for purchasing perks related to the intellectual property interest and the first entity, the credit lines corresponding to values of the plurality of considerations contributed into the pooling account;
   receiving a portion of the first entity's outside revenues; and
   increasing one or more of the credit lines of the plurality of additional entities in accordance with the amount of the received outside revenues.

2. The method according to claim 1, wherein the pooling account is a trust.

3. The method according to claim 1, further comprising allocating a predetermined portion of the received outside revenues to a management team.

4. The method according to claim 1, further comprising transferring the intellectual property interest to the first entity at the occurrence of a predetermined condition.

5. The method according to claim 4, wherein transferring the intellectual property interest to the first entity occurs as a result of a sale of the intellectual property interest to the first entity.

6. The method according to claim 5, wherein a sale price of the intellectual property interest is based at least partially on contributions made by the first entity to the pooling account.

7. The method according to claim 4, the predetermined condition being expiration of a predetermined time period.

8. The method according to claim 1, the first consideration contributed to the pooling account comprising an interest in at least one of a personality right, license, patent, trade secret, know-how, software, trademark, or domain name.

9. The method according to claim 1, at least one of the plurality of additional considerations contributed to the pooling account comprising money.

10. The method according to claim 1, the first entity having access to a consideration in the pooling account that was contributed to the pooling account by an entity other than the first entity.

11. The method according to claim 1, further comprising withdrawing from the pooling account salary payments for a management team.

* * * * *